United States Patent
Gonzales et al.

(10) Patent No.: US 11,597,075 B2
(45) Date of Patent: Mar. 7, 2023

(54) PICKUP BED TOOL ASSEMBLY

(71) Applicants: Roy Gonzales, Gilroy, CA (US); Rita Gonzales, Gilroy, CA (US)

(72) Inventors: Roy Gonzales, Gilroy, CA (US); Rita Gonzales, Gilroy, CA (US)

( * ) Notice: Subject to any disclaimer, the term of this patent is extended or adjusted under 35 U.S.C. 154(b) by 379 days.

(21) Appl. No.: 16/792,988

(22) Filed: Feb. 18, 2020

(65) Prior Publication Data
US 2021/0252692 A1 Aug. 19, 2021

(51) Int. Cl.
| | | |
|---|---|---|
| *B25J 1/00* | (2006.01) | |
| *B25J 18/02* | (2006.01) | |
| *B62D 33/02* | (2006.01) | |
| *B25J 1/04* | (2006.01) | |
| *B25G 1/04* | (2006.01) | |

(52) U.S. Cl.
CPC .............. *B25J 1/00* (2013.01); *B25G 1/04* (2013.01); *B25J 1/04* (2013.01); *B25J 18/025* (2013.01); *B62D 33/02* (2013.01)

(58) Field of Classification Search
CPC ..... B25J 1/00; B25J 1/04; B25J 18/025; B25J 18/02; B25G 1/04; B25G 3/26; B62D 33/00; B62D 33/02; A47F 13/06; B25H 5/004
See application file for complete search history.

(56) References Cited

U.S. PATENT DOCUMENTS

| | | |
|---|---|---|
| 6,293,601 B1 | 9/2001 | Johnson |
| 6,450,557 B1 | 9/2002 | Martinez |
| 6,607,338 B2 | 8/2003 | Lemke |
| 7,334,825 B1 | 2/2008 | Sammon |
| 7,347,467 B2 * | 3/2008 | Theobald ........... B62D 53/0857 294/24 |
| 7,478,851 B2 | 1/2009 | Geller |
| 7,490,880 B1 | 2/2009 | Matsui |
| 7,673,912 B2 | 3/2010 | Breininger |
| D714,600 S | 10/2014 | Bond |
| 10,245,721 B1 * | 4/2019 | West ...................... A47F 13/06 |
| 10,315,304 B1 * | 6/2019 | Cowan ..................... B25G 3/38 |
| 2004/0100109 A1 | 5/2004 | Johnson |

\* cited by examiner

*Primary Examiner* — Anita M King

(57) ABSTRACT

A pickup bed tool assembly includes a handle which has a first portion that slidably engages a second portion such that the handle has a telescopically adjustable length. A push bar is pivotally coupled to the handle for pushing cargo into a pickup bed. The push bar is positionable in a deployed position or a stored position. A locking unit is movably coupled to the handle. The locking unit releasably engages the push bar to retain the push bar in either the stored position or the deployed position. The locking unit is actuatable to disengage the push bar thereby facilitating the push bar to freely pivot on the handle. A hook is coupled to the handle to grapple cargo in the pickup bed for pulling the cargo out of the pickup bed.

15 Claims, 4 Drawing Sheets

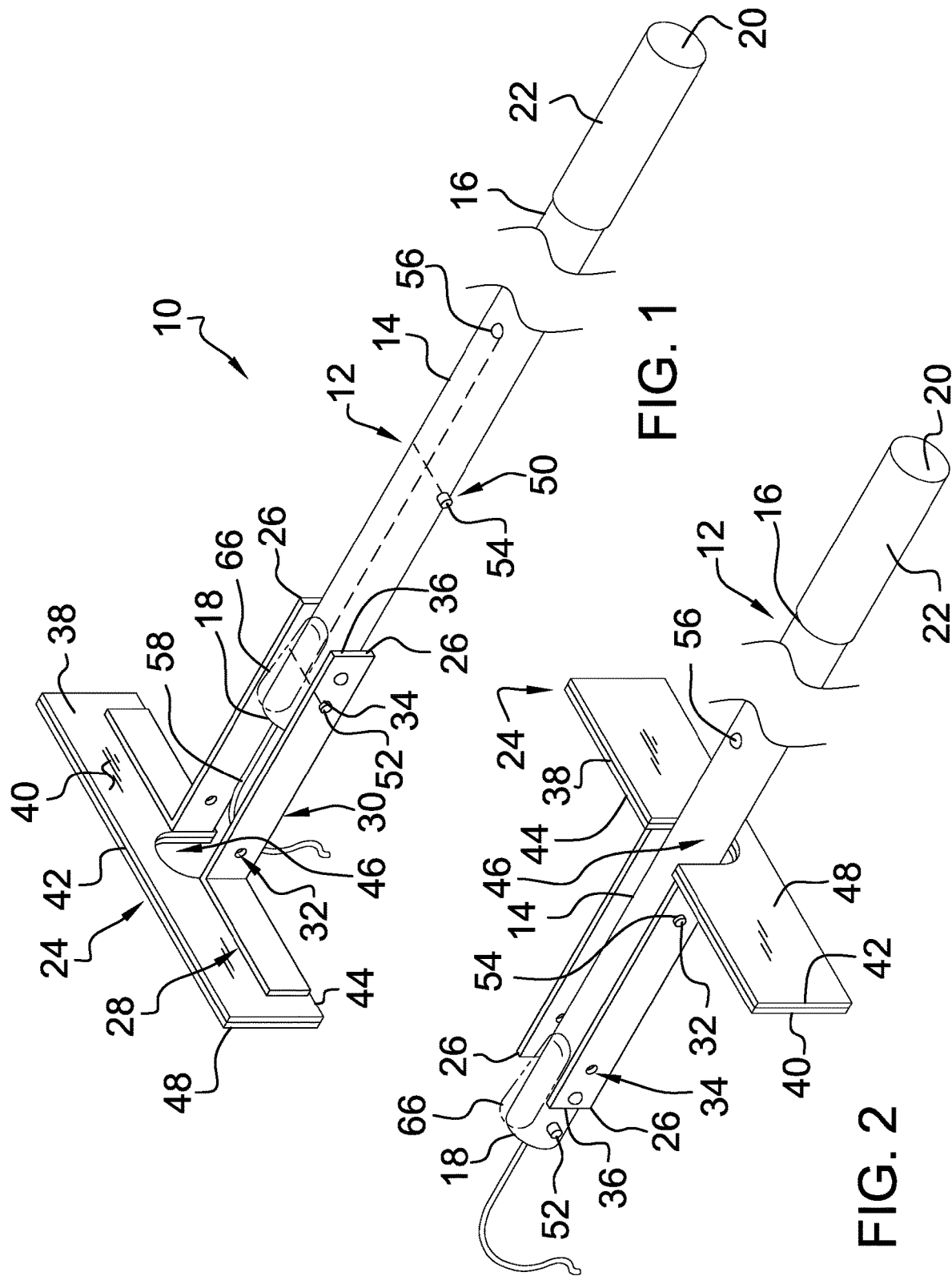

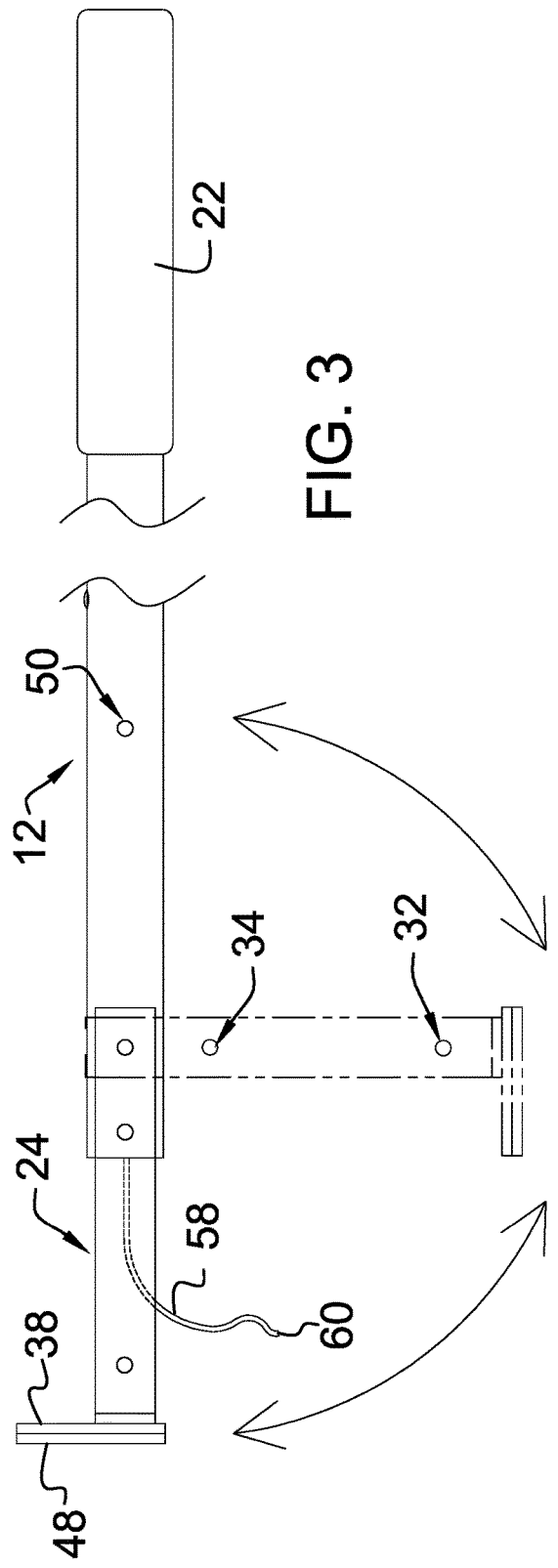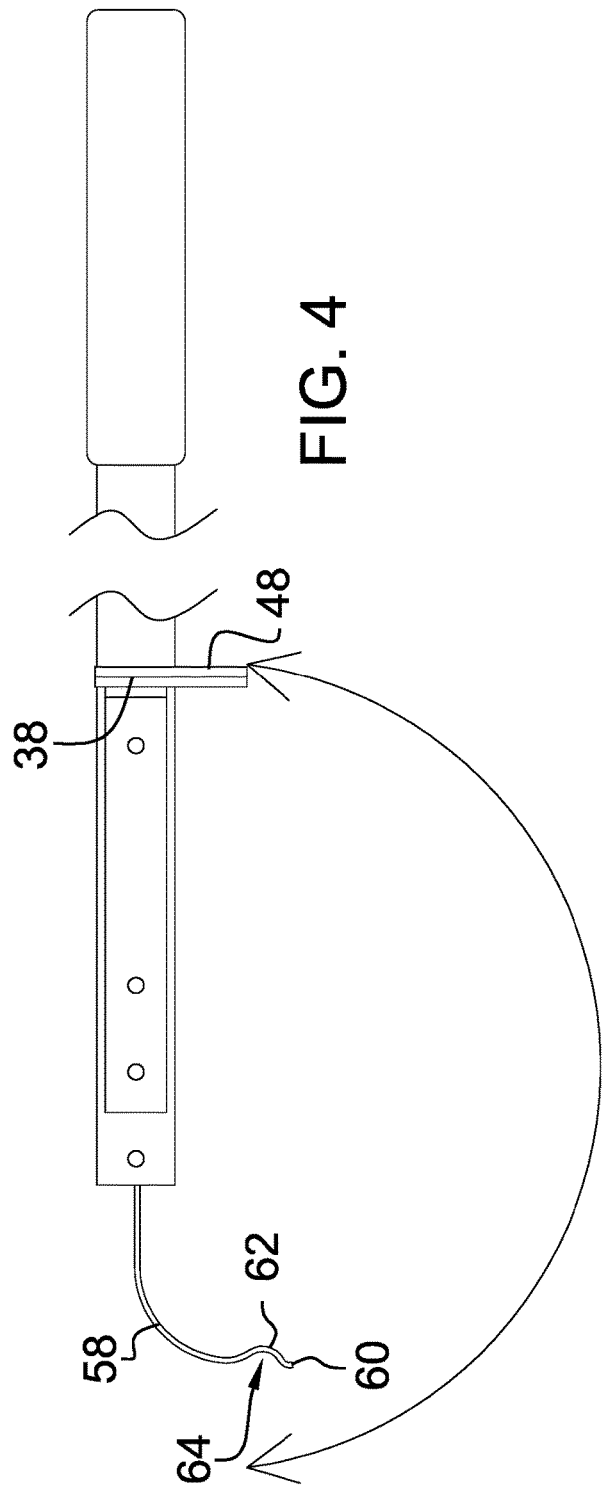

the bar to freely pivot on the handle. A hook is coupled to the handle to grapple cargo in the pickup bed for pulling the cargo out of the pickup bed.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

PICKUP BED TOOL ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to tool devices and more particularly pertains to a new tool device for pushing or pulling cargo in a pickup bed.

(2) Description of Related Art Including Information Disclosed Under 37 CFR 1.97 and 1.98

The prior art relates to tool devices. The prior art discloses a variety of cargo grapples that each includes a telescopic handle and a hooking element disposed on an end of the telescopic handle for engaging and dragging cargo in a pickup bed. In at least one instance the hooking element has a flattened surface for pushing against the cargo. Additionally, the prior art discloses a telescopic rod, which includes a light emitter, that is positionable across a truck bed for securing cargo. None of the prior art cited discloses a telescopic handle with a pivoting push bar in combination with a hooking element.

BRIEF SUMMARY OF THE INVENTION

An embodiment of the disclosure meets the needs presented above by generally comprising a handle which has a first portion that slidably engages a second portion such that the handle has a telescopically adjustable length. A push bar is pivotally coupled to the handle for pushing cargo into a pickup bed. The push bar is positionable in a deployed position or a stored position. A locking unit is movably coupled to the handle. The locking unit releasably engages the push bar to retain the push bar in either the stored position or the deployed position. The locking unit is actuatable to disengage the push bar thereby facilitating the push

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 1 is a top perspective view of a pickup bed tool assembly according to an embodiment of the disclosure showing a push bar in a deployed position.

FIG. 2 is a top perspective view of an embodiment of the disclosure showing a push bar in a stored position.

FIG. 3 is a left side view of an embodiment of the disclosure showing a push bar being moved into a deployed position.

FIG. 4 is a left view of an embodiment of the disclosure showing a push bar in a stored position.

DETAILED DESCRIPTION OF THE INVENTION

Figure 5:
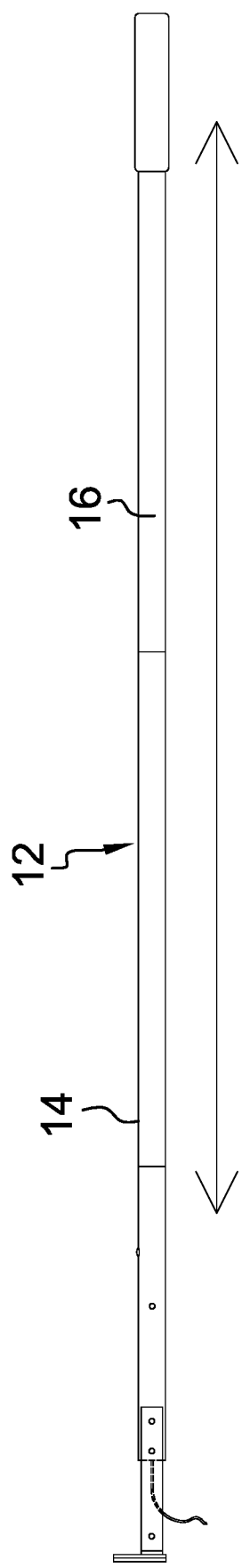
FIG. 5 is a left view of an embodiment of the disclosure.
Figure 6:
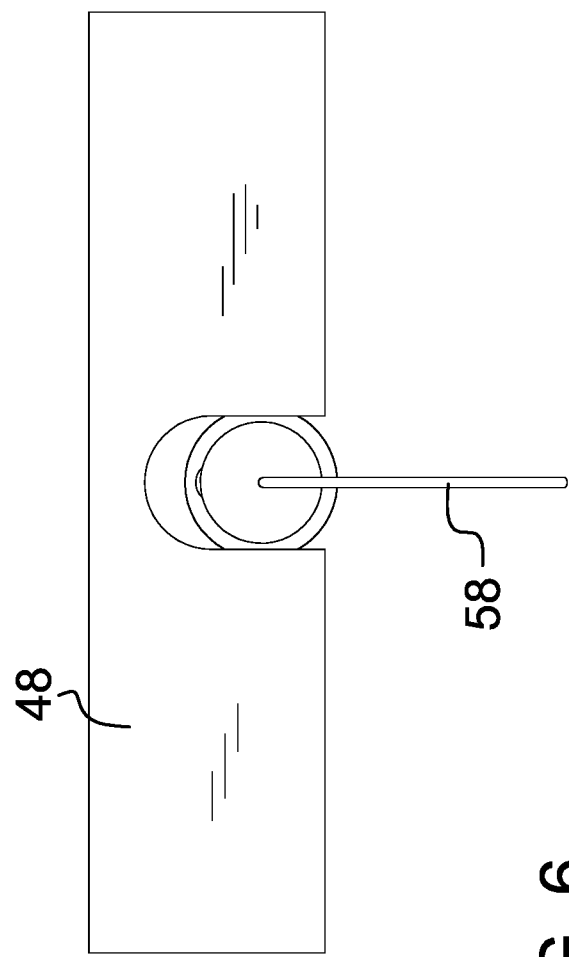
FIG. 6 is a front view of an embodiment of the disclosure.
Figure 7:
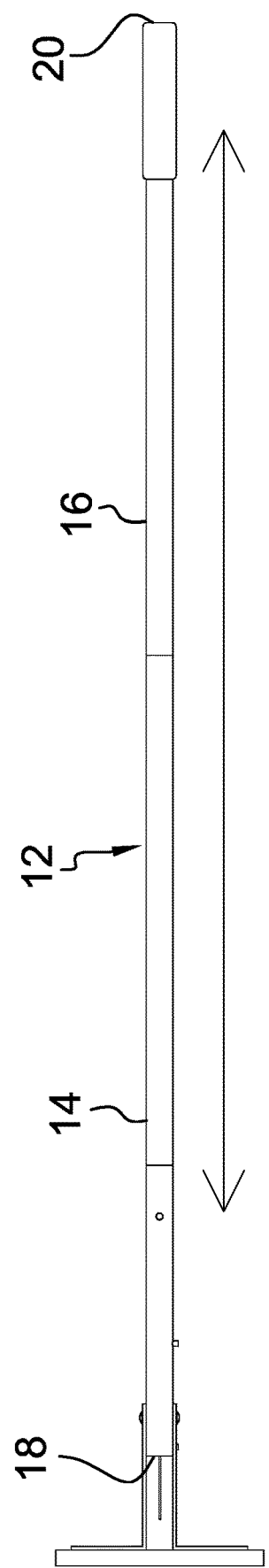
FIG. 7 is a top view of an embodiment of the disclosure.

With reference now to the drawings, and in particular to FIGS. 1 through 7 thereof, a new tool device embodying the principles and concepts of an embodiment of the disclosure and generally designated by the reference numeral 10 will be described.

As best illustrated in FIGS. 1 through 7, the pickup bed tool assembly 10 generally comprises a handle 12 that has a first portion 14 which slidably engages a second portion 16 such that the handle 12 has a telescopically adjustable length. The first portion 14 has a first end 18 and the second portion 16 has a second end 20. A grip 22 is positioned around the handle 12 to enhance gripping the handle 12 and the grip 22 extends from the second end 20 of the second portion 16 toward the first portion 14. Moreover, the grip 22 is comprised of a resiliently compressible material such as foam rubber or the like.

A push bar 24 is provided and the push bar 24 is pivotally coupled to the handle for pushing cargo into a pickup bed. The push bar 24 is positionable in a stored position having the push bar 24 resting against the handle 12. The push bar 24 comprises a pair of brackets 26 that each comprises a primary portion 28 forming an angle with a secondary portion 30. The secondary portion 30 of each of the brackets 26 has a first aperture 32 extending therethrough and the secondary portion 30 of each of the brackets 26 has a second aperture 34 extending therethrough. The first aperture 32 is positioned adjacent to an intersection between the primary portion 28 and the secondary portion 30. The second aperture 34 is positioned adjacent to a distal end 36 of the secondary portion 30.

The secondary portion 30 of each of the brackets 26 lies flat against the first portion 14 of the handle 12. Moreover, the secondary portion 30 of each of the brackets 26 is pivotally coupled to the first portion 14 of the handle 12 and the primary portion 28 of each of the brackets 26 is directed away from the first portion 14 in opposite directions from each other. The second portion 16 of each of the brackets 26 extends toward the second portion 16 of the handle 12 when the push bar 24 is in the stored position. Conversely, the second portion 16 of each of the brackets 26 extends beyond the first end 18 of the first portion 14 of the handle 12 when the push bar 24 is in a deployed position.

The push bar 24 includes a plate 38 that has a rear surface 40, a front surface 42 and a bottom edge 44. The primary portion 28 of each of the brackets 26 is coupled to and extends along the rear surface 40 such that the plate 38 is oriented to extend along an axis oriented perpendicular to a longitudinal axis of the handle 12. The plate 38 is comprised of a magnetic material to magnetically engage ferromagnetic cargo. The plate 38 has a slot 46 extending away from the bottom edge 44 and the slot 46 is centrally positioned along the bottom edge 44. The slot 46 accommodates the handle 12 when the push bar 24 is in the stored position.

A pad 48 is coupled to the front surface 42 of the plate 38 and the pad 48 completely covers the front surface 42. In this way the pad 48 can push against cargo when the push bar 24 is in the deployed position. The pad 48 is comprised of a resiliently compressible material, such as rubber or the like, to inhibit the pad 48 from abrading the cargo.

A locking unit 50 is movably coupled to the handle 12 and the locking unit 50 releasably engages the push bar 24 when the push bar 24 is in either the stored position or the deployed position. In this way the push bar 24 is retained in either the stored position or the deployed position. The locking unit 50 is actuatable to disengage the push bar 24 thereby facilitating the push bar 24 to freely pivot on the handle 12.

The locking unit 50 comprises a pair of first locks 52 and each of the first locks 52 extends outwardly from the first portion 14 of the handle 12. Each of the first locks 52 is positioned adjacent to the first end 18 of the first portion 14 and each of the first locks 52 is biased to extend outwardly from the handle 12. Each of the first locks 52 engages the first aperture 32 in the second portion 16 of a respective one of the brackets 26 when the push bar 24 is in the deployed position.

The locking unit 50 includes a pair of second locks 54 and each of the second locks 54 extends outwardly from the first portion 14 of the handle 12. The pair of second locks 54 is spaced along the handle 12 from the pair of first locks 52 and each of the second locks 54 is biased to extend outwardly from the handle 12. Additionally, each of the second locks 54 engages the second aperture 34 in the second portion 16 of a respective one of the brackets 26 when the push bar 24 is in the stored position.

The locking unit 50 includes a release button 56 that is movably coupled to the first portion 14 of the handle 12. The release button 56 is in mechanical communication with each of the first locks 52 and each of the second locks 54. Additionally, each of the first locks 52 and each of the second locks 54 are retracted when the release button 56 is depressed to facilitate the push bar 24 to freely pivot.

A hook 58 is coupled to the handle 12 to grapple cargo in the pickup bed for pulling the cargo out of the pickup bed. The hook 58 is positioned on the first end 18 of the first portion 14 of the handle 12 and the hook 58 has a distal end 60 with respect to the first end 18. The hook 58 is curved between the first end 18 and the distal end 60 of the hook 58 for grappling the cargo. Additionally, the hook 58 has a bend 62 thereon positioned adjacent to the distal end 60 of the hook 58 to define an undulating portion 64 of the hook 58.

As is most clearly shown in FIGS. 3 and 4, a light emitter 66 is coupled to the handle 12 and the light emitter 66 is positioned adjacent to the first end 18 of the first portion 14 of the handle 12. The light emitter 66 emits light when the light emitter 66 is turned on for illuminating the cargo and the pickup bed in a darkened environment. The light emitter 66 may comprise a LED flashlight or other similar light emitter which includes its own power supply and power switch. Additionally, the light emitter 66 is aligned with the slot 46 in the plate 38 when the push bar 24 is positioned in the deployed position to facilitate light to pass through the plate 38.

In use, the push bar 24 is positioned in the stored position and the handle 12 is extended into the pickup bed to facilitate the hook 58 to grapple cargo in the pickup bed. In this way the cargo can be pulled toward a user without requiring the user to climb into the pickup bed. The push bar 24 is positioned in the deployed position to facilitate the cargo to be pushed into the pickup bed for transportation. In this way the user can load cargo into the pickup bed without having to climb into the pickup bed.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A pickup bed tool assembly being configured to either push or pull cargo in a pickup bed, said assembly comprising:

a handle having a first portion slidably engaging a second portion such that said handle has a telescopically adjustable length;

a grip being positioned around said handle to enhance gripping said handle;

a push bar being pivotally coupled to said handle, said push bar being positionable in a deployed position having said push bar extending away from said handle wherein said push bar is configured to push cargo into a pickup bed, said push bar being positionable in a stored position having said push bar resting against said handle;

a locking unit being movably coupled to said handle, said locking unit releasably engaging said push bar when said push bar is in either said stored position or said deployed position for retaining said push bar in either said stored position or said deployed position, said locking unit being actuatable to disengage said push bar thereby facilitating said push bar to freely pivot on said handle; and a hook being coupled to said handle wherein said hook is configured to grapple cargo in the pickup bed for pulling the cargo out of the pickup bed.

2. The assembly according to claim 1, wherein:
said first portion has a first end, said second portion having a second end; and
said grip extends from said second end of said second portion toward said first portion, said grip being comprised of a resiliently compressible material.

3. The assembly according to claim 2, wherein said push bar comprises a pair of brackets, each of said brackets comprising a primary portion forming an angle with a secondary portion, said secondary portion of each of said brackets having a first aperture extending therethrough, said secondary portion of each of said brackets having a second aperture extending therethrough.

4. The assembly according to claim 3, wherein:
said first aperture is positioned adjacent to an intersection between said primary portion and said secondary portion; and
said second aperture is positioned adjacent to a distal end of said secondary portion.

5. The assembly according to claim 4, wherein said secondary portion of each of said brackets lies against said handle, said secondary portion of each of said brackets being pivotally coupled to said first portion of said handle having said primary portion of each of said brackets being directed away from said first portion in opposite directions from each other.

6. The assembly according to claim 5, wherein said second portion of each of said brackets extends toward said second portion of said handle when said push bar is in said stored position, said second portion of each of said brackets extending beyond said first end of said first portion of said handle when said push bar is in said deployed position.

7. The assembly according to claim 6, wherein said push bar includes a plate having a rear surface, a front surface and a bottom edge, said primary portion of each of said brackets being coupled to and extending along said rear surface such that said plate is oriented to extend along an axis being oriented perpendicular to a longitudinal axis of said handle.

8. The assembly according to claim 7, wherein said plate is comprised of a magnetic material wherein said plate is configured to magnetically engage ferromagnetic cargo.

9. The assembly according to claim 8, wherein said plate has a slot extending away from said bottom edge, said slot being centrally positioned along said bottom edge, said slot accommodating said handle when said push bar is in said stored position.

10. The assembly according to claim 9, wherein said push bar includes a pad being coupled to said front surface of said plate having said pad completely covering said front surface wherein said pad is configured to push against cargo when said push bar is in said deployed position, said pad being comprised of a resiliently compressible material wherein said pad is configured to inhibit abrading the cargo.

11. The assembly according to claim 6, wherein said locking unit comprises a pair of first locks, each of said first locks extending outwardly from said first portion of said handle, each of said first locks being positioned adjacent to said first end of said first portion, each of said first locks being biased to extend outwardly from said handle, each of said first locks engaging said first aperture in said secondary portion of a respective one of said brackets when said push bar is in said deployed position.

12. The assembly according to claim 11, wherein said locking unit comprises a pair of second locks, each of said second locks extending outwardly from said first portion of said handle, said pair of second locks being spaced along said handle from said pair of first locks, each of said second locks being biased to extend outwardly from said handle, each of said second locks engaging said second aperture in said secondary portion of a respective one of said brackets when said push bar is in said stored position.

13. The assembly according to claim 12, wherein said locking unit includes a release button being movably coupled to said first portion of said handle, said release button being in mechanical communication with each of said first locks and each of said second locks, each of said first locks and each of said second locks being retracted when said button is depressed to facilitate said push bar to freely pivot.

14. The assembly according to claim 2, wherein said hook is positioned on said first end of said first portion of said handle, said hook having a distal end with respect to said first end, said hook being curved between said first end and said distal end for grappling the cargo, said hook having a bend thereon being positioned adjacent to said distal end to define an undulating portion of said hook.

15. A pickup bed tool assembly being configured to either push or pull cargo in a pickup bed, said assembly comprising:
a handle having a first portion slidably engaging a second portion such that said handle has a telescopically adjustable length, said first portion having a first end, said second portion having a second end;
a grip being positioned around said handle to enhance gripping said handle, said grip extending from said second end of said second portion toward said first portion, said grip being comprised of a resiliently compressible material;
a push bar being pivotally coupled to said handle, said push bar being positionable in a deployed position having said push bar extending away from said handle wherein said push bar is configured to push cargo into a pickup bed, said push bar being positionable in a stored position having said push bar resting against said handle, said push bar comprising:
a pair of brackets, each of said brackets comprising a primary portion forming an angle with a secondary portion, said secondary portion of each of said brackets having a first aperture extending therethrough, said secondary portion of each of said brackets having a second aperture extending therethrough, said first aperture being positioned adjacent to an intersection between said primary portion and said secondary portion, said second aperture being positioned adjacent to a distal end of said secondary portion, said secondary portion of each of said brackets ties against said handle, said secondary portion of each of said brackets being pivotally coupled to said first portion of said handle having said primary portion of each of said brackets being directed away from said first portion in opposite directions from each other, said secondary portion of each of said brackets extending toward said second portion of said handle when said push bar is in said stored position, said secondary portion of each of said brackets extending beyond said first end of said first portion of said handle when said push bar is in said deployed position;
- a plate having a rear surface, a front surface and a bottom edge, said primary portion of each of said brackets being coupled to and extending along said rear surface such that said plate is oriented to extend along an axis being oriented perpendicular to a longitudinal axis of said handle, said plate being comprised of a magnetic material wherein said plate is configured to magnetically engage ferromagnetic cargo, said plate having a slot extending away from said bottom edge, said slot being centrally positioned along said bottom edge, said slot accommodating said handle when said push bar is in said stored position; and
- a pad being coupled to said front surface of said plate having said pad completely covering said front surface wherein said pad is configured to push against cargo when said push bar is in said deployed position, said pad being comprised of a resiliently compressible material wherein said pad is configured to inhibit abrading the cargo;

a locking unit being movably coupled to said handle, said locking unit releasably engaging said push bar when said push bar is in either said stored position or said deployed position for retaining said push bar in either said stored position or said deployed position, said locking unit being actuatable to disengage said push bar thereby facilitating said push bar to freely pivot on said handle, said locking unit comprising:

a pair of first locks, each of said first locks extending outwardly from said first portion of said handle, each of said first locks being positioned adjacent to said first end of said first portion, each of said first locks being biased to extend outwardly from said handle, each of said first locks engaging said first aperture in said secondary portion of a respective one of said brackets when said push bar is in said deployed position;

a pair of second locks, each of said second locks extending outwardly from said first portion of said handle, said pair of second locks being spaced along said handle from said pair of first locks, each of said second locks being biased to extend outwardly from said handle, each of said second locks engaging said second aperture in said secondary portion of a respective one of said brackets when said push bar is in said stored position; and a release button being movably coupled to said first portion of said handle, said release button being in mechanical communication with each of said first locks and each of said second locks, each of said first locks and each of said second locks being retracted when said button is depressed to facilitate said push bar to freely pivot; and a hook being coupled to said handle wherein said hook is configured to grapple cargo in the pickup bed for pulling the cargo out of the pickup bed, said hook being positioned on said first end of said first portion of said handle, said hook having a distal end with respect to said first end, said hook being curved between said first end and said distal end for grappling the cargo, said hook having a bend thereon being positioned adjacent to said distal end to define an undulating portion of said hook.

* * * * *